United States Patent [19] [11] 4,292,919
Taylor [45] Oct. 6, 1981

[54] NON-METALLIC PASTE SECTORS AND METHODS OF FABRICATING AND UTILIZING SAME

[76] Inventor: Walter C. Taylor, 60690 Nine Mile Rd., South Lyon, Mich. 48178

[21] Appl. No.: 78,466

[22] Filed: Sep. 24, 1979

[51] Int. Cl.[3] .......... B05C 1/00; B41F 13/10; B41F 27/06; B32B 27/00

[52] U.S. Cl. .......... 118/212; 101/378; 428/422; 428/424.6

[58] Field of Search .......... 101/376, 379, 378; 118/212, 202, 264; 428/422, 424.6

[56] References Cited

U.S. PATENT DOCUMENTS 2,781,278 2/1957 Harmon .......... 118/212 X
3,006,317 10/1961 Showalter .......... 118/262 X
3,377,949 4/1968 Prince .......... 101/376 X
3,450,099 6/1969 Petersen .......... 118/212
4,015,046 3/1977 Pinkston et al. .......... 428/422

*Primary Examiner*—Michael R. Lusignan
*Attorney, Agent, or Firm*—Irving M. Weiner; Pamela S. Burt; John L. Shortley

[57] ABSTRACT

A paste sector for applying paste in a predetermined pattern to an item being manufactured, such as to the open bottom portion of a partially formed bag in a bag making machine. The paste sector is molded from a substantially resilient non-metallic material, and includes an added-thickness bottom portion adapted to be directly fitted to a paste sector shaft. The paste sector is preferably injection molded from a rubber-like urethane material, and is provided with a Teflon coating having an affinity for the low viscosity paste employed in the fabrication of paper bags.

7 Claims, 7 Drawing Figures

NON-METALLIC PASTE SECTORS AND METHODS OF FABRICATING AND UTILIZING SAME

BACKGROUND OF THE INVENTION

1. Field of the Invention

The present invention relates generally to a paste sector for applying paste in a predetermined pattern to an item being manufactured, such as to the inner and outer bottom flaps of bags disposed on the drum of a bag making machine.

More particularly, the invention relates to a paste sector for disposal on a paste sector shaft of a bottom pasting station of a bag making machine. The paste sector shaft with the paste sector disposed thereon cooperates with an assembly which provides a paste film to the paste sector, and the paste sector in accordance with the invention in turn effectively applies a film of paste to the open bottom of a paper bag as the partially formed bag passes through the bottom pasting station of the bag making machine.

2. Description of Relevant Art

In the manufacture of paper bags, there is known a variety of different types of bag making machines which form conventional paper bags from a sheet of paper dispensed from a large paper roll. Various operations are performed on the paper as it passes through a plurality of stations including sequentially, for example, a tube forming station, a score station, a cutting and bottom portion opening station, and a bottom forming station. Normally, after the bag bottom formation is completed in the bottom forming station, the bottom portion of the bag is flattened against the forming drum of the bag making machine, and the partially formed bag is then conveyed by the drum to a bottom pasting station.

The bottom pasting station of the bag making machine may comprise, for example, a paste sector mounted on a paste sector shaft, which shaft is geared to the forming drum of the bag making machine, and may be mounted on bearing blocks which are spring loaded toward the forming drum of the machine. A lever and cam arrangement may be provided for selective lifting of the paste sector away from the drum surface when it is desired to withhold paste application to the open bottoms of the partially formed bags.

Operatively cooperating with the paste sector and shaft is an assembly for providing a paste film to the paste sector itself, which in turn applies a film of paste to the open bottom of the partially formed bag. Such assembly may comprise, for example, a pan for containing the substantially low viscosity paste, a metal applicator roll which may be geared to the paste sector shaft and which is loaded with paste about its periphery from the open pan of paste, and a doctor member which cooperates with the applicator roll to permit a predetermined thickness of paste to pass from the applicator roll to the paste sector.

When the partially formed bag, flattened against the forming drum such that the flaps of the open bottom of the bag are positioned to be engaged by the paste sector, is received in the bottom pasting station, the paste sector is rotated against the paste applicator roll so as to transfer a film of paste of desired thickness from the applicator roll to the open bottom flaps of the bag.

After application of the paste to the open bottom of the bag in the bottom pasting station as described hereinabove, the partially formed bag then passes through several more stations wherein final cutting, tucking, bottom closing, and various other operations may be effected, until the finally formed bag is ultimately delivered to the final station of the bag making machine, such as a delivery table.

The conventional paste sector employed in the bottom pasting station as described hereinabove is normally formed of metal, such as brass. The paste sector includes a raised paste-applying surface portion, which may for example be corrugated, for applying the paste in a predetermined pattern to the open bottom flaps of the bag being formed. Such known paste sectors, however, have a number of serious shortcomings and disadvantages attendant therewith.

Due to the rigidity of the material from which the paste sectors are formed, viz., brass, it is necessary to employ sponge rubber mountings, or alternatively a hinge arrangement, in order to compensate for variation in the thickness of the open bottom of the bags being formed. Such sponge rubber mounting of the paste sectors tends to lead to instability during operation. Further, the paste applicator roll against which the paste sector is rotated during the paste application procedure is normally itself formed of metal, such as brass. The repeated rotational contact of the paste sector against the brass surface of the applicator roll has a tendency to cause excessive wear to the brass paste sectors, and a deteriorating effect on the paste sectors results. Yet another shortcoming of the known paste sector construction is the small holes necessarily formed therein during fabrication to permit bolting of the metal paste sector to a mandrel for machining purposes, and for ultimately mounting the paste sectors on pins during use.

Illustrative of a known adhesive applying device is the "ADHESIVE APPLYING DEVICE" disclosed in U.S. Pat. No. 1,851,761 issued in 1932 to Everett. Such device includes rollers for applying adhesive which may be employed with sodium silicate, which is quite different to remove when dry from metal or wood rollers. The rollers are provided with tubular covers formed from a cementitious material such as phenolic resin and a filler, with the outer portion comprising a layer of unfilled cementitious material. Only the outer portion of the metallic rollers is non-metallic, with the surfaces being formed of a smooth, hard material such as phenolic.

Illustrative of a known bottom paste applying arrangement for bag making machines is the "LOW VISCOSITY BOTTOM PASTE APPLICATOR FOR BAG MACHINES" disclosed in U.S. Pat. No. 3,450,099 issued in 1969 to Petersen. In such arrangement, paste is applied to paste sectors using a metering pump to apply paste to a transfer roll, and a doctor blade to concentrate paste to the area of the transfer roll which contacts the paste sector. The paste sector employed in such arrangement is of a conventional construction.

Yet another adhesive applying device is illustrated by the "APPLICATOR ROLL" disclosed in U.S. Pat. No. 3,529,336 issued in 1970 to Winkler et al. Such device comprises an applicator for applying latex to self-sealing bags or envelopes. The applicator is formed by a strip of soft embossed polyvinyl chloride mounted to a gumming cylinder. The polyvinyl chloride is employed due to its resistance to being attacked by latex, contrary to rubber material. The polyvinyl chloride is soft, and conventional glue will not adhere thereto.

The above-discussed known adhesive applying constructions have failed individually and collectively to provide any solution to the problems attendant the paste sectors of known construction as described hereinabove.

The present invention is directed to effectively eliminating the various shortcomings and disadvantages attendant known paste sectors as described hereinabove. The paste sector according to the present invention eliminates the need for any special sponge rubber mounting or hinge arrangement to accommodate variations in thickness, thus greatly enhancing stability during operation. Further, the paste sector in accordance with the present invention easily accommodates irregularities, is highly wear-resistant even after repetitive use while bearing against a metal paste applicator roll, and does not require the formation of holes therein during fabrication thereof.

SUMMARY OF THE INVENTION

The present invention provides a paste sector for applying paste to an item being manufactured, the paste sector including a main body having a raised upper surface portion for directly applying paste in a predetermined pattern to the item being manufactured and being provided with opposite end fastening portions for mounting the paste sector to a shaft of a machine for manufacturing the item. The main body of the paste sector is integrally molded from a substantially resilient non-metallic material. Preferably, the resilient non-metallic material comprises a rubber-like urethane material, and the main body of the paste sector is injection molded therefrom.

It is an object of the invention to provide a paste sector having a surprising affinity for the substantially low viscosity paste normally employed in the fabrication of conventional paper bags by providing the paste sector with a surface coating of "TFE" fluorocarbon (Teflon).

A further object resides in the provision of a paste sector which includes an added-thickness portion integrally molded with the main body along the lower portion thereof and having a concave lower surface which is formed to be directly closely received against an arcuate mounting surface portion of a paste sector shaft of a bag making machine.

Yet another object of the invention is to provide a paste sector having a generally arcuate cross-sectional configuration, and which is substantially imperforate.

Other objects and details of the present invention will become apparent from the following description, when read in conjunction with the accompanying drawings.

DETAILED DESCRIPTION OF PREFERRED EMBODIMENTS

Figure 2:
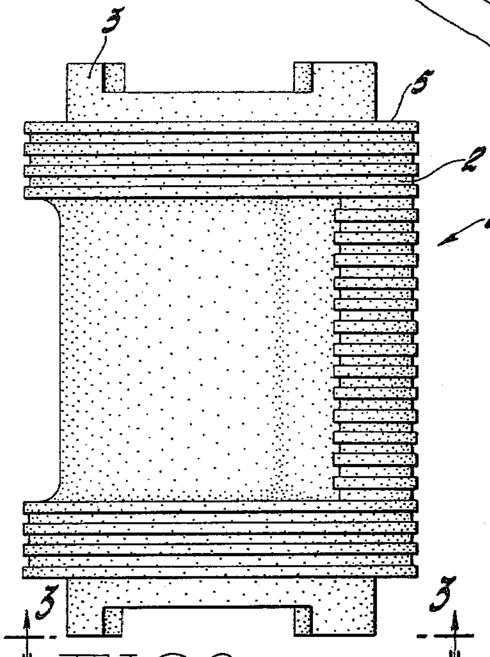
FIG. 2 is a top plan view of a paste sector in accordance with a preferred embodiment of the present invention.
Figure 3:
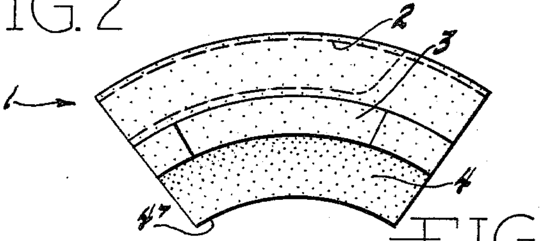
FIG. 3 is a view taken along line 3—3 in FIG. 2.

With reference to FIGS. 2 and 3, there is depicted a paste sector 1 in accordance with a first preferred embodiment of the present invention. The paste sector 1 comprises a generally arcuate main body, as shown in FIG. 3.

In accordance with a primary novel feature of the present invention, the paste sector 1 (as well as the various paste sectors described hereinbelow) is injection molded from a non-metallic synthetic or plastic material having a resilient quality. Although it is contemplated that the paste sector 1 may be fabricated of a wide variety of suitable materials, such as nylon, polyvinyl chloride, etc., the preferred material is a rubber-like urethane material, such as that manufactured under the trademark "Flexane" by the Devcon Company. Such material is noted for its high tensile strength, tear resistance, abrasion resistance, and substantial resiliency, and it is contemplated that any suitable material exhibiting similar qualities may be employed in fabricating the paste sector 1.

In the injection molding fabrication of the paste sector 1, it is highly preferable that the mold itself be precoated with a "TFE" fluorocarbon (Teflon), which results in a Teflon coating on the finished paste sector product. Such Teflon coating provides an unexpected affinity for the substantially low viscosity paste normally employed in the fabrication of conventional paper bags.

As shown in FIG. 2, the injection molded paste sector 1 includes a raised paste-applying surface 2, which in this embodiment is shown as comprising a corrugated, substantially U-shaped, raised surface. Such U-shaped configuration applies a substantially U-shaped paste film to an item being manufactured, such as the open bottom portion of a partially formed bag in the bottom pasting station of a paper bag making machine. However, various other paste-applying surface configurations may be employed, as will be described in detail hereinbelow, and the invention is not limited in scope to the U-shaped configuration shown in FIG. 2.

The main body of the paste sector 1 further includes opposite outwardly-extending integral flange portions 3 which comprise fastening portions for securing the paste sector 1 to a paste sector shaft, and as shown such portions 3 are recessed along a portion of the length thereof, for a purpose to be described in detail hereinbelow. The securing of paste sector 1 to a paste sector shaft, such as of a bag making machine, will be described in detail hereinbelow with reference to FIG. 1.

The main body of paste sector 1 further includes a lower added-thickness portion 4 which is integrally molded as a part of the main body so as to extend integrally with the lower portion of the main body between the opposite end faces 5 thereof.

The paste sector 1 as described hereinabove provides a number of advantages over conventional metal paste sector constructions. First, because the paste sector 1 is molded of a substantially resilient non-metallic material (preferably a rubber-like urethane material), a substantial wear-resistance quality is afforded thereto. Because the paste sector bears against a metal plaste applicator roll so as to receive paste therefrom during the pasting operation, there is a strong tendency for conventional metallic paste sectors to manifest material wear after repetitive usage. Such deteriorating wear characteristic is substantially eliminated by the novel rubber-like urethane paste sector according to the present invention. Further, whereas conventional metal paste sectors include various holes which are necessitated by having to bolt them to a mandrel for machining during fabrication, or for mounting the paste sectors in use, such holes are not necessary in the injection-molding fabrication of the paste sectors according to the present invention. As shown in FIG. 2, the paste sector 1 in accordance with the present invention is substantially imperforate, with no undesirable holes being formed therein.

In addition, because the paste sector 1 is fabricated of a rubber-like urethane material having a resilient quality, and includes the lower added-thickness portion 4, the need for separate sponge rubber mounting pads or hinge arrangements employed with conventional metal paste sectors to compensate for variations in thickness of the material, is eliminated. The resilient property of the paste sector 1 according to the invention easily accommodates irregularities in the thickness of the open bag bottom as paste is applied thereto, without the use of special sponge rubber mounting pads. Thus, the instability normally associated with sponge-rubber mounted metal paste sectors is effectively avoided.

With regard to the added-thickness portion 4, the lower concave surface 4' thereof is curved to very closely correspond to the curvature of the outer mounting surface of the paste sector shaft (viz., substantially the same radius of curvature), and such surface 4' is mounted directly against the outer surface of the paste sector shaft. In one working embodiment of the invention, the thickness of paste sector 1 excluding added-thickness portion 4 was 11/16 inch, while the overall thickness dimension including added-thickness portion 4 was $1\frac{1}{8}$ inches.

Figure 5:
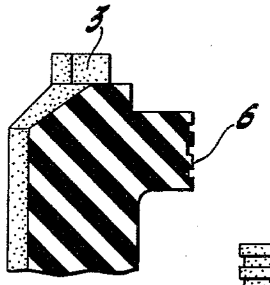
FIG. 5 is a sectional view taken along line 5—5 in FIG. 4.
Figure 4:
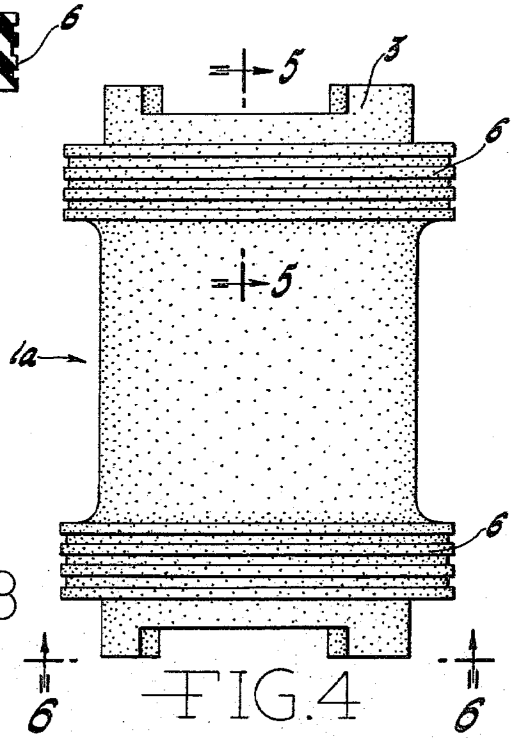
FIG. 4 is a top plan view of a paste sector in accordance with the invention, having a modified raised paste-applying surface.
Figure 6:
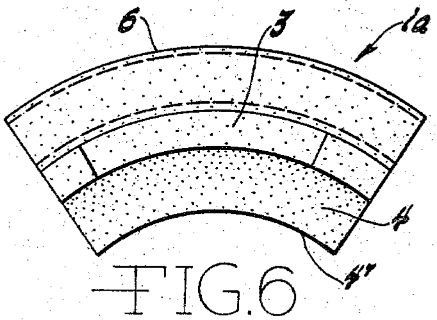
FIG. 6 is a view taken along line 6—6 in FIG. 4.

With reference to FIGS. 4 through 6, a paste sector **1*a* having the same general characteristics as described hereinabove with reference to paste sector 1 is depicted, however, in this embodiment the raised upper paste-applying surface is modified to define two corrugated surfaces 6. As shown in FIG. 4, the raised corrugated surfaces 6 are disposed adjacent opposite ends of paste sector 1*a***, to define a spaced-apart pair of corrugated paste-applying surfaces.

Figure 7:
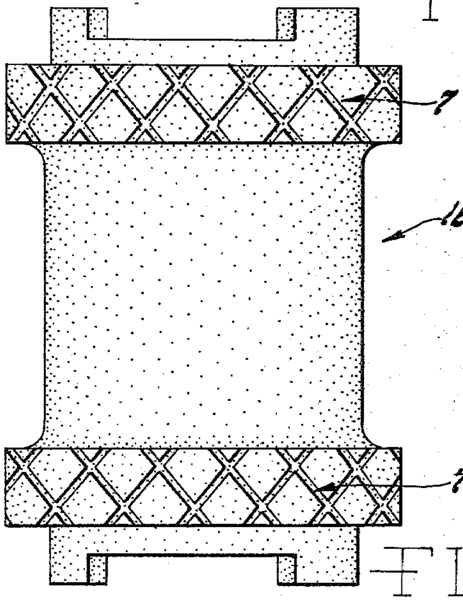
FiG. 7 is a top plan view of a paste sector having yet another modified raised paste-applying surface.

With reference to FIG. 7, the paste sector **1*b* is substantially similar to paste sector 1 described hereinbove, however, in this embodiment the raised upper paste-applying surface is modified to define two surfaces 7 having a crosshatched pattern of recesses, in contrast to the corrugated configuration of the paste-applying surfaces of paste sectors 1 and 1*a*. The raised crosshatched surfaces 7 are disposed adjacent opposite ends of paste sector 1*b*** to define a spaced-apart pair of crosshatched paste-applying surfaces.

Figure 1:
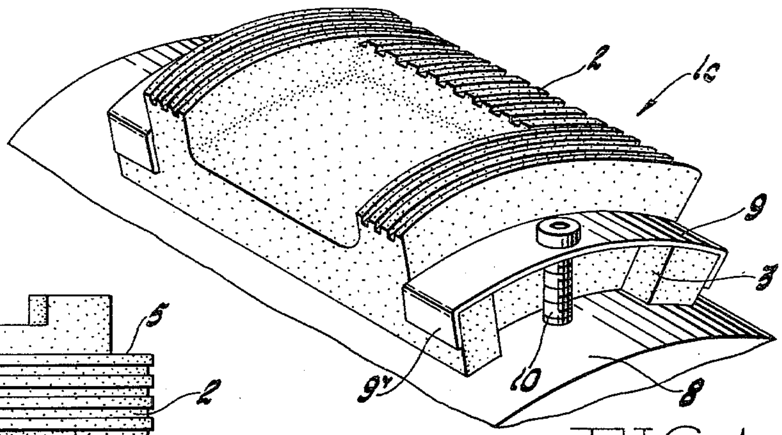
FIG. 1 is a perspective view of a paste sector according to the present invention, shown mounted in an operative position on a paste sector shaft of a paper bag making machine.

Referring now to FIG. 1, the attachment of a paste sector in accordance with the invention to a paste sector shaft 8 of a bag making machine is illustrated. Although the paste sector **1*c* of FIG. 1 is not shown as including the added-thickness portion 4 of paste sectors, 1, 1*a* and 1*b*, it is to be understood that each of the paste sectors 1, 1*a*, 1*b* and 1*c*, are secured to the paste sector shaft 8 in much the same manner. Further, it will be understood that although added-thickness portion 4 is eliminated in paste sector 1*c*, the lower surface of paste sector 1*c* is curved to closely fit to the curvature of paste sector shaft 8** so as to be closely directly fitted thereagainst.

In mounting paste sector **1*c* to paste sector shaft 8, the lower concave surface of paste sector 1*c* is fitted directly to the curved surface of shaft 8, as shown in FIG. 1. A hold-down plate 9, which may be formed, for example, of metal, is adapted to be closely received over the fastening portion 3 such that each side lip 9' thereof fits closely around the edge of fastening portion 3 to provide lateral stability of paste sector 1*c* on shaft 8. Hold-down plate 9 is provided with a central aperture through which is received a bolt 10. The bolt 10 passes through the recessed portion of fastening portion 3 to be received in an aperture suitably disposed in shaft 8. Each opposite fastening portion 3 of paste sector 1*c* is fastened to shaft 8 in this manner, to provide a secure mounting of the paste sector on shaft 8**.

It is contemplated that the fastening means described hereinabove with reference to FIG. 1 may be replaced by various other suitable fastening arrangements. For example, rather than providing a recess in flange portion 3, such recess may be eliminated, and a bolt-receiving aperture may be provided in the central portion of the continuous flange. Further, it is contemplated that the fastening portions may take the form of flange-like ears adapted to be engaged by wedge blocks for securing the paste sector to the shaft.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A paste sector for mounting to a paste sector shaft of a bag making machine so as to apply paste to the open bottom of a bag being manufactured, said paste sector comprising:

a main body including a central non-pasting upper surface portion having a raised upper surface portion extending integrally upwardly therefrom along at least opposite end portions of said central upper surface portion for applying paste in a predetermined pattern to the open bottom of a bag being manufactured;

said main body including a lower surface which is concave and is curved so as to be directly closely fitted against a curved mounting surface portion of said paste sector shaft;

said main body having a generally arcuate cross-sectional configuration;

said main body being substantially imperforate;

said main body including integral opposite end fastening portions for mounting said paste sector to said paste sector shaft; and said main body of said paste sector, including said raised upper surface portion, said non-pasting upper surface portion and said end fastening portions being integrally injection molded from a substantially resilient non-metallic material comprising a rubber-like urethane material.

2. A paste sector according to claim 1, wherein:

said main body of said paste sector is provided with a surface coating of "TFE" fluorocarbon (Teflon).

3. A paste sector according to claim 1, wherein:

said main body includes two oppositely-disposed end surfaces;

said fastening portions extend integrally outwardly from each of said end surfaces; and said main body includes an added-thickness portion integrally molded with said main body and extending along the lower portion of said main body between said opposite end surfaces thereof.

4. A paste sector according to claim 3, wherein:

said added-thickness portion of said main body includes said lower concave surface of said main body which is curved so as to be directly closely fitted against a curved mounting surface portion of said shaft of said machine.

5. A paste sector according to claim 1, wherein:

said raised upper surface portion of said main body comprises a corrugated upper surface for applying paste in a predetermined pattern to said item being manufactured.

6. A paste sector according to claim 1, wherein:

said raised upper surface portion of said main body includes recessed portions defining a crosshatched pattern on said upper surface for applying paste in a predetermined pattern to said item being manufactured.

7. A paste sector according to claim 3, wherein:

said fastening portions comprise flanges extending integrally outwardly from each of said end surfaces of said main body for engagement by a hold-down plate for mounting said paste sector to said shaft of said machine;

said fastening portions are provided with recesses extending along a portion of the length thereof; and said hold-down plate includes an aperture for receiving therethrough a threaded fastener which extends through said recess of said flange fastening portion for threaded engagement in an aperture provided in said shaft of said machine.

* * * * *